United States Patent
Ma et al.

(10) Patent No.: US 10,261,905 B2
(45) Date of Patent: Apr. 16, 2019

(54) ACCESSING CACHE WITH ACCESS DELAY REDUCTION MECHANISM

(71) Applicant: Alibaba Group Holding Limited, Grand Cayman (KY)

(72) Inventors: Ling Ma, Hangzhou (CN); Zhihong Wang, Hangzhou (CN); Lei Zhang, Hangzhou (CN)

(73) Assignee: Alibaba Group Holding Limited (KY)

( * ) Notice: Subject to any disclaimer, the term of this patent is extended or adjusted under 35 U.S.C. 154(b) by 265 days.

(21) Appl. No.: 15/337,287

(22) Filed: Oct. 28, 2016

(65) Prior Publication Data

US 2017/0123989 A1    May 4, 2017

(30) Foreign Application Priority Data

Oct. 29, 2015   (CN) .......................... 2015 1 0717175

(51) Int. Cl.
*G06F 12/0862*  (2016.01)
*G06F 12/0811*  (2016.01)

(52) U.S. Cl.
CPC ...... *G06F 12/0862* (2013.01); *G06F 12/0811* (2013.01); *G06F 2212/283* (2013.01); *G06F 2212/602* (2013.01); *Y02D 10/13* (2018.01)

(58) Field of Classification Search
USPC ........................................................ 711/122
See application file for complete search history.

(56) References Cited

U.S. PATENT DOCUMENTS

| 6,535,958 | B1  | 3/2003 | Fuoco et al. | |
|---|---|---|---|---|
| 2004/0172518 | A1* | 9/2004 | Saruwatari | G06F 9/3804 712/207 |
| 2006/0168401 | A1 | 7/2006 | Chatterjee et al. | |
| 2007/0043908 | A1 | 2/2007 | Diefendorff | |
| 2013/0151816 | A1* | 6/2013 | Indukuru | G06F 9/3853 712/206 |
| 2015/0052337 | A1 | 2/2015 | Greiner et al. | |
| 2015/0186283 | A1 | 7/2015 | Mungikar et al. | |

OTHER PUBLICATIONS

PCT Search Report and Written Opinion dated Jan. 3, 2017 for PCT Application No. PCT/US16/59352, 11 pages.

* cited by examiner

*Primary Examiner* — Mardochee Chery
(74) *Attorney, Agent, or Firm* — Lee & Hayes, P.C.

(57) ABSTRACT

A method for accessing a cache including reading an access instruction for acquiring data; determining, according to a delay identifier carried by the access instruction, whether the access instruction produces a delay; accessing the cache and performing, according to a location identifier carried by the access instruction, a pre-fetch operation if a delay is produced; and modifying, according to a location where the data required by the access instruction is acquired, the delay identifier and the location identifier carried by the access instruction. The technical solutions solve the problem of a low hit rate upon cache access, reduce the probability of misses, and reduce an access delay caused by a level-by-level access to each level of cache upon target data acquisition, which correspondingly lowers the power consumption generated upon the cache access and improves the CPU performance.

20 Claims, 6 Drawing Sheets

ACCESSING CACHE WITH ACCESS DELAY REDUCTION MECHANISM

CROSS-REFERENCE TO RELATED APPLICATION

The present disclosure claims the benefit of Chinese Patent Application Number 201510717175.9 filed Oct. 29, 2015, entitled "Method, Device, and Electronic Apparatus for Accessing Cache" which is hereby incorporated by reference in its entirety.

TECHNICAL FIELD

The present disclosure relates to the field of computer technologies, and, more particularly, to a method for accessing cache, and a device for accessing cache. The present disclosure also relates to an electronic apparatus.

BACKGROUND

To solve the problems associated with low memory accessing speed, a multi-level cache architecture is introduced according to temporal and spatial locality features of data. The term cache refers to one or more small-size high-speed associated storage devices. When a processor reads or writes, the processor first checks whether target data exists in the cache. If yes, the processor first points to the cache rather than other storages (such as a memory). The multi-level cache architecture improves the access performance. Upon an access to a Level 1 Cache, if no target data exists in the Level 1 Cache, that is, there is a miss, a Level 2 Cache will be accessed. If no target data exists in the Level 2 Cache either, a cache of a next level will be accessed, until the target data is acquired. Although the multi-level cache architecture sets the Level 1 Cache and Level 2 Cache to reduce an access delay and sets a Level 3 Cache to reduce a miss rate, the introduction of the multi-level cache architecture also increases a delay in accessing each level of cache. For example: it takes 6 cycles from a miss upon the access to the Level 1 Cache to the access to the Level 2 Cache, and it takes 8 cycles from a miss upon the access to the Level 2 Cache to the access to the Level 3 Cache.

As shown, although the multi-level cache architecture is set to reduce the access delay, in case of a miss upon a cache access and a low hit rate, the access delay caused by a level-by-level access to each level of cache will accumulate gradually, which finally results in a significant delay. Moreover, a level-by-level access to each level of cache will generate redundant power consumption. In case of simultaneously accessing each level of cache, although the hit rate for target data acquisition may be improved and the misses may be reduced, there will be more redundant power consumption.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides a method for accessing cache and a device for accessing cache to solve the problem in the conventional techniques that have a delay upon cache access. The present disclosure also relates to an electronic apparatus.

The present disclosure provides a method for accessing a cache, where the method for accessing a cache includes:
reading an access instruction for acquiring data;
determining, according to a delay identifier carried by the access instruction, whether the access instruction produces a delay;
accessing a cache and performing, according to a location identifier carried by the access instruction, a pre-fetch operation if a delay is produced; and
modifying, according to a location of the data acquired by the access instruction, the delay identifier and the location identifier carried by the access instruction.

Optionally, the delay identifier and the location identifier carried by the access instruction are identifiers, marked with bits, set in a cache line of the access instruction.

Optionally, the delay includes:
a delay produced upon a level-by-level cache access in case of data missing, or a delay produced when the access instruction executes a computation.

Optionally, the determining, according to a delay identifier carried by the access instruction, whether the access instruction produces a delay includes:
reading a numerical value of the delay identifier, which is carried by the access instruction and marked with bits, to determine whether the access instruction produces a delay.

Optionally, the reading a numerical value of the delay identifier, which is carried by the access instruction and marked with bits, to determine whether the access instruction produces a delay specifically includes:
reading a numerical value of the delay identifier, which is carried by the access instruction and marked with binary bits, and determining whether the numerical value of the delay identifier, which is carried by the access instruction and marked with binary bits, is greater than 1; and
indicating that the access instruction produces a delay if the numerical value is greater than 1, and executing the step of accessing a cache and performing, according to a location identifier carried by the access instruction, a pre-fetch operation.

Optionally, the accessing a cache and performing, according to a location identifier carried by the access instruction, a pre-fetch operation includes:
reading a numerical value of the location identifier, which is carried by the access instruction and marked with bits; and
accessing, upon access to a Level 1 Cache, a cache level or memory corresponding to the numerical value of the location identifier according to the numerical value of the location identifier, which is carried by the access instruction and marked with bits.

Optionally, after the step of accessing, upon access to a Level 1 Cache, according to the numerical value of the location identifier, which is carried by the access instruction and marked with bits, a cache level or memory corresponding to the numerical value of the location identifier, the method includes:
determining whether the data required by the access instruction is acquired in the Level 1 Cache and the cache level or memory corresponding to the numerical value of the location identifier; and if not, sequentially accessing each level of cache according to a hierarchy order of multiple levels of cache and memory, until the data required by the access instruction is acquired.

Optionally, after the data required by the access instruction is acquired, the method further includes:

recording the location of the data acquired by the access instruction.

Optionally, the modifying, according to a location of the data acquired by the access instruction, the delay identifier and the location identifier carried by the access instruction includes:

determining whether the recorded location of the data acquired by the access instruction is the Level 1 Cache;

if yes, decrementing the delay identifier, which is carried by the access instruction and marked with bits; or if not, incrementing the delay identifier, which is carried by the access instruction and marked with bits, and determining whether the recorded location of the data acquired by the access instruction is the cache level or memory corresponding to the numerical value of the location identifier, and if it's determined that the recorded location of the data acquired by the access instruction is not the cache level or memory corresponding to the numerical value of the location identifier, setting, according to the recorded location of the data acquired by the access instruction, the location identifier carried by the access instruction, so that the location identifier carried by the access instruction represents a cache level or memory, from which the data required by the access instruction is acquired.

Optionally, after the step of decrementing the delay identifier, which is carried by the access instruction and marked with bits, the method includes:

determining whether the recorded location of the data acquired by the access instruction includes the cache level or memory corresponding to the numerical value of the location identifier; and if yes, discarding the data required by the access instruction, which is acquired at the cache level or memory corresponding to the numerical value of the location identifier.

Correspondingly, the present disclosure further provides a device for accessing a cache, where the device for accessing a cache includes:

an access instruction reading unit that reads an access instruction for acquiring data;

a delay identifier determining unit that determines, according to a delay identifier carried by the access instruction, whether the access instruction produces a delay;

a cache access pre-fetching unit that receives the determining result from the delay identifier determining unit, and if a delay is produced, accesses a cache and perform, according to a location identifier carried by the access instruction, a pre-fetch operation; and an identifier modifying unit that modifies, according to a location of the data acquired by the access instruction, the delay identifier and the location identifier carried by the access instruction.

Optionally, the delay identifier determining unit specifically determines, according to the identifiers, marked with bits, set in a cache line of the access instruction, whether the access instruction produces a delay.

Optionally, the delay identifier determining unit specifically determines, according to the delay identifier carried by the access instruction, whether the access instruction produces a delay which is produced upon a level-by-level cache access in case of data missing, or a delay which is produced when the access instruction executes a computation.

Optionally, the delay identifier determining unit specifically reads a numerical value of the delay identifier, which is carried by the access instruction and marked with bits, to determine whether the access instruction produces a delay.

Optionally, the delay identifier determining unit includes:

a numerical value reading sub-unit that reads a numerical value of the delay identifier, which is carried by the access instruction and marked with binary bits, and determines whether the numerical value of the delay identifier, which is carried by the access instruction and marked with binary bits, is greater than 1; and a cache access pre-fetch trigger sub-unit that receives the determining result from the numerical value reading sub-unit, and triggers the cache access pre-fetching unit if the numerical value is greater than 1.

Optionally, the cache access pre-fetching unit includes:

a bit numerical value reading sub-unit that reads a numerical value of the location identifier, which is carried by the access instruction and marked with bits;

a cache access pre-fetch sub-unit that accesses, upon access to a Level 1 Cache, a cache level or memory corresponding to the numerical value of the location identifier according to the numerical value of the location identifier, which is carried by the access instruction and marked with bits.

Optionally, the cache access pre-fetching unit further includes:

a data acquisition determining sub-unit that, after accessing, upon access to the Level 1 Cache, according to the numerical value of the location identifier, which is carried by the access instruction and marked with bits, the cache level or memory corresponding to the numerical value of the location identifier, determines whether the data required by the access instruction is acquired in the Level 1 Cache and the cache level or memory corresponding to the numerical value of the location identifier; and a level-by-level access sub-unit that receives the determining result from the data acquisition determining sub-unit, and if not, sequentially accesses each level of cache according to a hierarchy order of multiple levels of cache and a memory, until the data required by the access instruction is acquired.

Optionally, the device for accessing a cache further includes:

a location recording unit that records the location of the data acquired by the access instruction.

Optionally, the identifier modifying unit includes:

a location determining sub-unit that determines whether the recorded location of the data acquired by the access instruction is the Level 1 Cache;

a decrementing sub-unit that receives the determining result from the position determining sub-unit, and if the determining result is yes, decrements the delay identifier, which is carried by the access instruction and marked with bits;

an incrementing sub-unit that receives the determining result from the position determining sub-unit, and if the determining result is not, increments the delay identifier, which is carried by the access instruction and marked with bits, and determines whether the recorded location of the data acquired by the access instruction is the cache level or memory corresponding to the numerical value of the location identifier; and a location identifier setting sub-unit that receives the determining result from the incrementing sub-unit, and if the determining result is not, sets, according to the recorded location of the data acquired by the access instruction, the location identifier carried by the access instruction, so that the location identifier carried by the access instruction represents a cache level or memory, from which the data required by the access instruction is acquired.

Optionally, the decrementing sub-unit includes:

a repeated location determining sub-unit that, after the delay identifier, which is carried by the access instruction and marked with bits, is decremented, determines whether the recorded location of the data acquired by the access instruction includes the cache level or memory corresponding to the numerical value of the location identifier; and a data discarding sub-unit that receives the determining result from the repeated location determining sub-unit, and if the determining result is yes, discards the data required by the access instruction, which is acquired at the cache level or memory corresponding to the numerical value of the location identifier.

In addition, the present disclosure further provides an electronic apparatus that includes:

a display;

one or more processors; and one or more computer storage devices that store a cache parallel accessing program or computer-executable instructions, which, when being read and executed by the processors, executes the following operations: reading an access instruction for acquiring data; determining, according to a delay identifier carried by the access instruction, whether the access instruction produces a delay; accessing a cache and performing, according to a location identifier carried by the access instruction, a pre-fetch operation if a delay is produced; and modifying, according to a location of the data acquired by the access instruction, the delay identifier and the location identifier carried by the access instruction.

Compared with the conventional techniques, the present disclosure has the following advantages:

The method for accessing a cache, the device for accessing a cache, and the electronic apparatus according to the present disclosure read an access instruction for acquiring data; determine, according to a delay identifier carried by the access instruction, whether the access instruction produces a delay; access a cache and perform, according to a location identifier carried by the access instruction, a pre-fetch operation if a delay is produced; and modify, according to a location where the data required by the access instruction is acquired, the delay identifier and the location identifier carried by the access instruction. The technical solution solves the problem of low hit rate upon cache access, reduces the probability of misses, and reduces an access delay caused by a level-by-level access to each level of cache upon target data acquisition, which correspondingly lowers the power consumption generated upon the cache access and improves the CPU performance.

BRIEF DESCRIPTION OF THE DRAWINGS

In order to explain example embodiments of the present disclosure clearly, a brief introduction of drawings is described below. Apparently, the drawings described below are merely some example embodiments of the present disclosure, and other drawings may be obtained according to these drawings by those skilled in the art.

DETAILED DESCRIPTION

In order to understand the above objectives, features, and advantages of the present disclosure more clearly, the present disclosure is further described in detail with reference to the accompanying drawings and specific implementations. It should be noted that, without contradiction, the example embodiments of the present disclosure and features in the example embodiments may be combined with each other.

Specific details are illustrated in the following descriptions to fully understand the present disclosure. However, the present disclosure may be implemented in multiple other modes different from the descriptions herein, and similar developments may be made by those skilled in the art without departing from the spirit of the present disclosure. Therefore, the present disclosure is not limited by the concrete implementation as disclosed below.

The example embodiments of the present disclosure provide a method for accessing a cache and a device for accessing a cache, and the example embodiments of the present disclosure also provide an electronic apparatus, which are described in detail one by one below.

The multi-level cache architecture improves the access performance. Upon an access to a Level 1 Cache, if no target data exists in the Level 1 Cache, that is, there is a miss, a Level 2 Cache will be accessed. If no target data exists in the Level 2 Cache either, a cache of a next level will be accessed, until the target data is acquired. Although the multi-level cache architecture sets the Level 1 Cache and Level 2 Cache to reduce an access delay and sets a Level 3 Cache to reduce a miss rate, the introduction of the multi-level cache architecture also increases a delay in accessing each level of cache. For example: it takes 6 cycles from a miss upon the access to the Level 1 Cache to the access to the Level 2 Cache, and it takes 8 cycles from a miss upon the access to the Level 2 Cache to the access to the Level 3 Cache. As shown, although the multi-level cache architecture is set to reduce the access delay, in case of a miss upon a cache access and a low hit rate, the access delay caused by a level-by-level access to each level of cache still accumulates gradually, which finally results in a significant delay. Moreover, a level-by-level access to each level of cache will generate redundant power consumption. In case of simultaneously accessing each level of cache, although the hit rate for target data acquisition may be improved and the misses may be reduced, there will be more redundant power consumption. In terms of such problem, the technical solution of the present disclosure reads an access instruction for acquiring data; determines, according to a delay identifier carried by the access instruction, whether the access instruction produces a delay; if a delay is produced, accesses a cache and performs a pre-fetch operation according to a location identifier carried by the access instruction; and modifies the delay identifier and the location identifier carried by the access instruction according to a location of the data acquired by the access instruction, thereby reducing the access delay upon cache access.

The method and device for accessing a cache provided by the example embodiments of the present disclosure may be applied to intelligent apparatuses such as a computer, and may also be applied to other electronic apparatuses on which application programs are installed, for example, a smartphone, a palm computer, a tablet computer and so on, to reduce a delay in memory access, and make usage easier for users.

To make the technical solutions according to the present disclosure easier to understand, prior to the detailed description of the example embodiments, a brief introduction to the technical solution of the present disclosure is described as follows.

The cache is a caching area for data exchange (referred to as Cache). When certain hardware needs to read a piece of data, firstly the search is carried out in a Level 1 Cache. If the data is found, the data will be read immediately and sent to a CPU for processing; if no data is found, a cache of a next level will be accessed. If no data can be found in the cache, the data will be read from memory with a relatively low speed and sent to the CPU for processing. Meanwhile, a data block where the data is located will be transferred to the cache, so that the whole data block is read from the cache subsequently, without calling the memory. As the running speed of the cache is much higher than that of the memory, the function of the cache is just to help the hardware run faster.

The cache usually adopts a multi-level cache architecture including a Level 1 Cache (L1 Cache for short), which is located around the CPU kernel, and is a CPU cache most closely integrated with the CPU, and is also the earliest CPU cache in history. Due to the technical difficulty and the highest manufacturing cost of the Level 1 Cache, a capacity improvement will result in a significant increase in the technical difficulty and cost, but the performance improvement is not significant, which hence results in a low price-performance ratio. Moreover, the hit rate of the existing Level 1 Cache is already high. Therefore, the capacity of the Level 1 Cache is the smallest among others, which is much lower than that of the Level 2 Cache.

The Level 2 Cache, L2 Cache for short, is a second-level high-speed cache of a CPU, which is classified into an internal chip and an external chip. The internal chip Level 2 Cache runs at a same speed as the clock speed, and the external Level 2 Cache runs at a speed, which is only half of the clock speed. The capacity of the L2 high-speed cache also affects the performance of the CPU.

The Level 3 Cache, L3 Cache for short, may include an external type, which reduces the memory latency while improving the performance of the processor in case of a massive data computation. It is helpful in reducing the memory latency and improving the massive data computation capability. Also, in the field of servers, the addition of such L3 Cache still brings significant performance improvement. The third-level cache is mainly set to reduce the miss rate.

The memory is one of the most important components in a computer. It is a bridge for communication with the CPU. The memory is also referred to as an internal memory, which is used to temporarily store operation data in the CPU and exchange data with an external memory such as a hard disk drive. As long as the computer is running, the CPU would transfer operation data to the memory for operation. After the operation is finished, the CPU sends a result. The running of the memory also determines the stable running of the computer.

Figure 1:
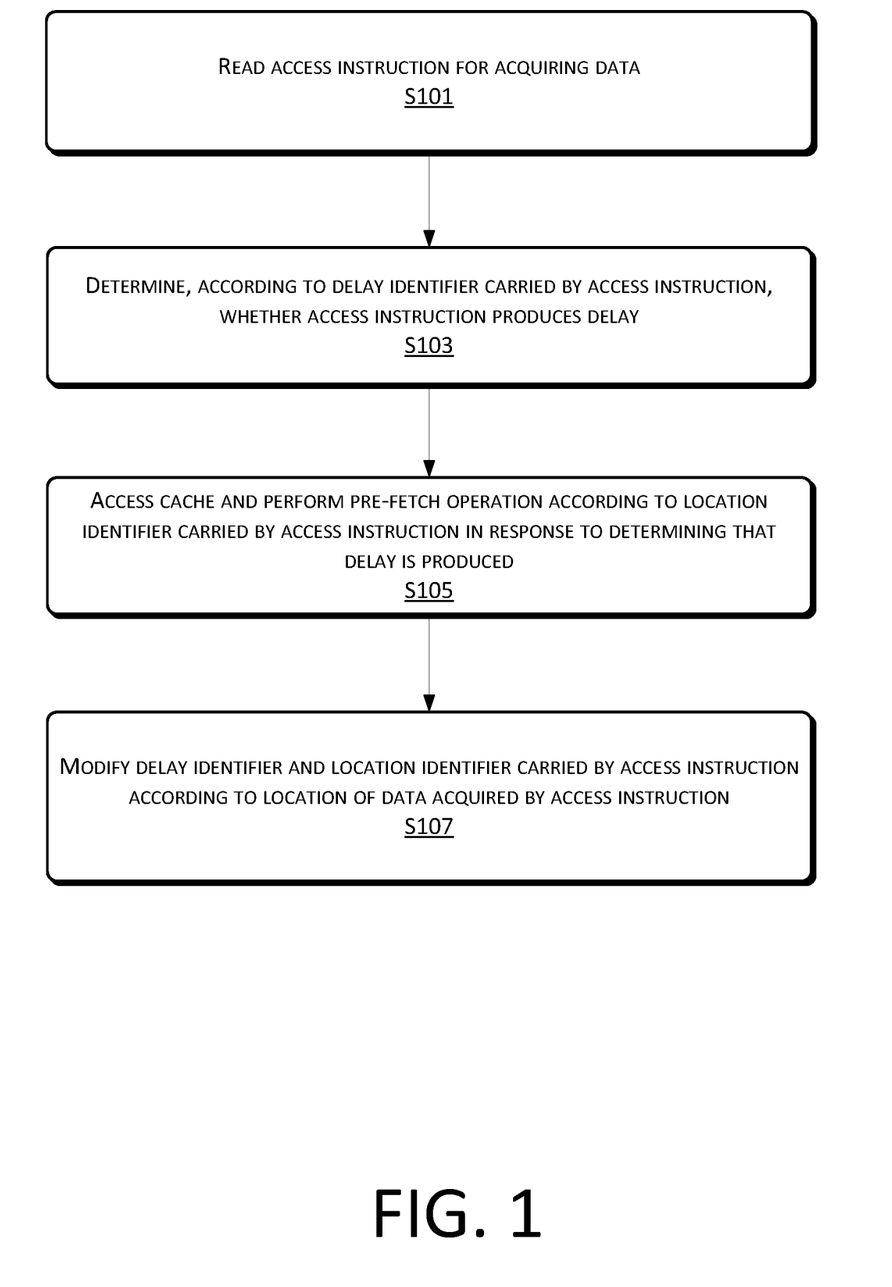
FIG. 1 is a flow chart of a method for accessing a cache according to an example embodiment of the present disclosure.

An example embodiment of the present disclosure provides a method for accessing a cache. The example embodiment of the method for accessing a cache is described as follows:

Refer to FIG. 1, which shows a flow chart of a method for accessing a cache according to an example embodiment of the present disclosure.

The example method for accessing a cache includes:

Step S101: An access instruction for acquiring data is read.

In this example embodiment, the reading an access instruction for acquiring data includes: extracting, from a computer storage device that stores the access instruction, the access instruction for acquiring data, and loading the access instruction. In Step S101, when the access instruction for acquiring data is read, volume information of the data that the access instruction needs to acquire is acquired.

It should be noted that, when the CPU executes an access instruction, firstly, it is necessary to extract the access instruction from the computer storage device that stores the access instruction, that is, complete an instruction extraction process. Then, the access instruction is decoded or tested and a corresponding operation control signal is generated to initiate a corresponding operation for the data that the access instruction needs to acquire, for example, a memory read/write operation, an arithmetic logical operation, or an input/output operation. The execution process of the access instruction is actually a cyclic process of extracting the instruction from the instruction storage, analyzing the instruction, and executing the instruction.

Step S103: Determine, according to a delay identifier carried by the access instruction, whether the access instruction produces a delay.

In Step S101, when the access instruction for acquiring data is being read, it is also necessary to read the delay identifier carried by the access instruction. The delay identifier carried by the access instruction is an identifier, marked with bits, set in a cache line of the access instruction.

In this example embodiment, the determining, according to a delay identifier carried by the access instruction, whether the access instruction produces a delay may be implemented in the following manner: reading a numerical value of the delay identifier, which is carried by the access instruction and marked with bits, to determine whether the access instruction produces a delay.

In the process of executing the access instruction by the CPU, if the access instruction produces a delay upon access to a cache or memory, next time the execution of such access instruction will still produce a delay upon access to the same level of cache or memory, which results in a performance obstruction. Based on such feature, it is determined, by predicting the obstruction, whether the access instruction will produce a delay upon execution.

For example, the delay identifier, marked with bits, set in the cache line of the access instruction is marked by two binary bits. That is, Bit 1 and Bit 0 are set in the cache line of the access instruction. Because of the binary bits, the delay identifier carried by the access instruction has the following values:

| Bit 1 | Bit 0 |
|---|---|
| 0 | 0 |
| 0 | 1 |
| 1 | 0 |
| 1 | 1 | where Bit 1 and Bit 0 are two binary bits set in the cache line of the access instruction. 4 groups of binary numerical values below Bit 1 and Bit 0 are specific values corresponding to Bit 1 and Bit 0.

It should be noted that, in terms of the values, when the values of Bit 1 and Bit 0 are set to be 0 and 0 and the values of Bit 1 and Bit 0 are set to be 0 and 1, that is: when the decimal numerical value converted from the numerical value of the two binary bits is less than 1 or equal to 1, this indicates that the access instruction will not produce a delay during cache access; when the values of Bit 1 and Bit 0 are set to be 1 and 0 and the values of Bit 1 and Bit 0 are set to be 1 and 1, that is: when a decimal numerical value converted from the numerical value of the two binary bits is greater than 1, this indicates that the access instruction will produce a delay upon cache access.

In the above 4 groups of specific values of Bit 1 and Bit 0, each group of values is assigned according to an actual execution result of the access instruction, and the specific meaning corresponding to each group of values is set in advance and is used to determine whether the access instruction produces a delay upon execution.

It should be noted that, in this example embodiment, the delay that the access instruction may produce upon cache access includes the following two types:

The first type is a delay produced upon a level-by-level cache access in case of data missing.

It should be noted that, the CPU uses the multi-level cache architecture to improve the access performance. The access order is: Level 1 Cache, Level 2 Cache, Level 3 Cache, memory. However, a different degree of delay will be produced upon access to each level of cache, which affects the performance.

In the first case, the Level 2 Cache is accessed only after a miss is found upon access to the Level 1 Cache (required data is not acquired in the Level 1 Cache). The Level 3 Cache is accessed after a miss is found upon access to the Level 2 Cache (required data is not acquired in the Level 2 Cache), until the memory is accessed.

Specifically, it takes 6 cycles from a miss upon access to the Level 1 Cache to the access to the Level 2 Cache, and it takes 8 cycles from a miss upon access to the Level 2 Cache to the access to the Level 3 Cache.

The second type is a delay produced when the access instruction executes a computation.

le;.5qThe delay, which is produced when the access instruction performs a complex computation after the cache access, should be noted. For example, after the required data is acquired from the cache, in case of a computation based on such data, a computation delay will be produced due to the complex computation formula or the complex computation method per se.

In a specific implementation, Step 103 of determining, according to a delay identifier carried by the access instruction, whether the access instruction produces a delay may be implemented in the following manner: reading a numerical value of the delay identifier, which is carried by the access instruction and marked with binary bits, and determining whether the numerical value of the delay identifier, which is carried by the access instruction and marked with binary bits, is greater than 1; if the numerical value is greater than 1, indicating that the access instruction produces a delay, and executing the step of accessing a cache and performing, according to a location identifier carried by the access instruction, a pre-fetch operation; or if the numerical value is less than or equal to 1, accessing a cache according to a normal cache accessing order.

It should be noted that, the determining whether a numerical value of the delay identifier, which is carried by the access instruction and marked with binary bits, is greater than 1 specifically includes: converting the numerical value of the delay identifier marked with binary bits into a decimal numerical value, and determining whether the decimal numerical value is greater than 1.

Step S105: In response to determining that a delay is produced, a cache is accessed and a pre-fetch operation is performed according to a location identifier carried by the access instruction.

In Step S103, if the numerical value of the delay identifier, which is carried by the access instruction and marked with binary bits, is greater than 1, it indicates that the access instruction will produce a delay upon cache access or memory access, and in this case, Step 105 will be executed.

After it is determined that the access instruction will produce a delay upon cache access or memory access, the pre-fetch operation may be performed for the location identifier carried by the access instruction. The accessing a cache and performing, according to a location identifier carried by the access instruction, a pre-fetch operation specifically include Step S105-1 to Step S105-2, which are described below with reference to FIG. 2.

Figure 2:
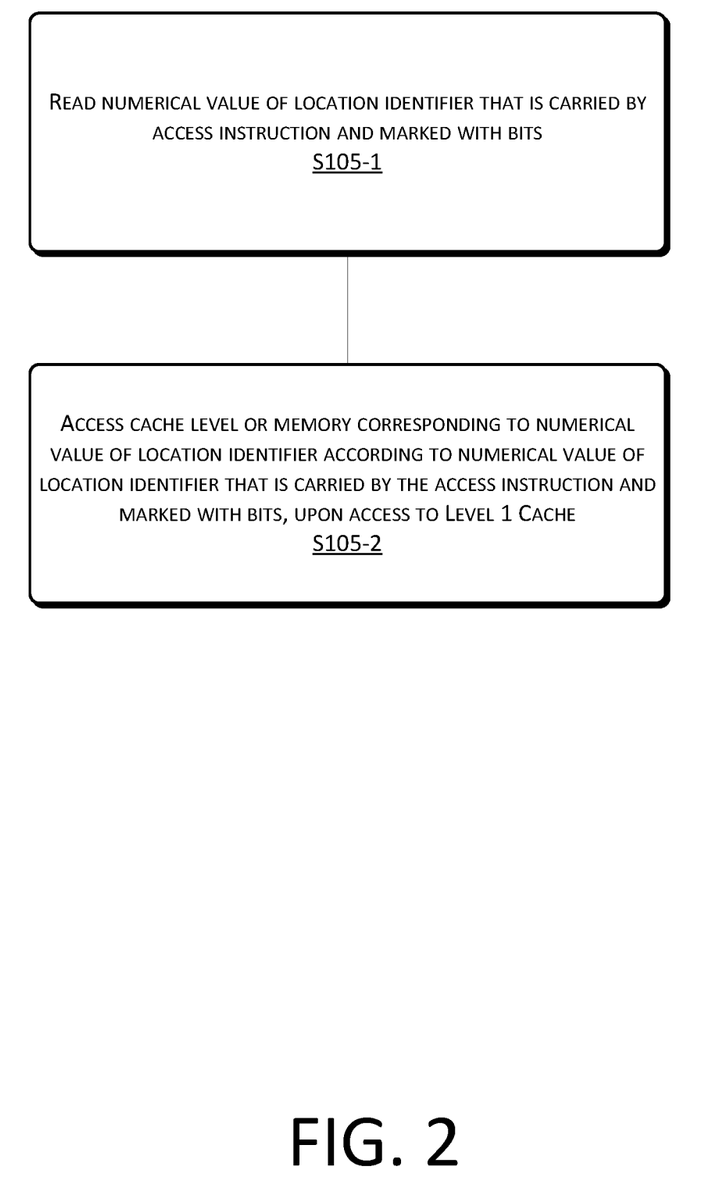
FIG. 2 is a flow chart of accessing a cache and performing, according to a location identifier carried by the access instruction, a pre-fetch operation according to an example embodiment of the present disclosure.

Refer to FIG. 2, which shows a flow chart of accessing a cache and performing, according to a location identifier carried by the access instruction, a pre-fetch operation according to an example embodiment of the present disclosure.

Step S105-1: A numerical value of the location identifier, which is carried by the access instruction and marked with bits, is read.

In the process of executing the access instruction by the CPU, if the access instruction produces a delay upon access to a cache or memory, next time the execution of such access instruction will still produce a delay upon access to the same level of cache or memory, which results in a performance obstruction, that is, it is indicated that the data is acquired in the same level of cache or memory. Based on such feature, by predicting the obstruction, it is feasible to determine in which level of cache or memory the data that the access instruction needs to acquire is located.

It should be noted that, the delay identifier carried by the access instruction is an identifier, marked with bits, set in a cache line of the access instruction.

Specifically, the delay identifier, marked with bits, set in the cache line of the access instruction is marked by using two binary bits. That is, Bit 3 and Bit 2 are set in the cache line of the access instruction for marking. Because of the binary bits, the delay identifier carried by the access instruction has the following values:

| Bit 3 | Bit 2 |
|---|---|
| 0 | 0 |
| 0 | 1 |
| 1 | 0 |
| 1 | 1 | where Bit 3 and Bit 2 are two binary bits set in the cache line of the access instruction, and 4 groups of binary numerical values below Bit 3 and Bit 2 are specific values corresponding to Bit 3 and Bit 2.

It should be noted that, in the foregoing values, when the values of Bit 3 and Bit 2 are set to be 0 and 0, the decimal numerical value converted from the numerical value of such two binary bits is 0, which indicates that the data required by the access instruction is acquired in the Level 1 Cache, that is, the delay produced upon execution of the access instruction comes from the execution of a complex computation. When the values of Bit 3 and Bit 2 are set to be 0 and 1, the decimal numerical value converted from the numerical value of such two binary bits is 1, which indicates that the data required by the access instruction is acquired in the Level 2 Cache. When the values of Bit 3 and Bit 2 are set to be 1 and 0, the decimal numerical value converted from the numerical value of such two binary bits is 2, which indicates that the data required by the access instruction is acquired in the Level 3 Cache. When values of Bit 3 and Bit 2 are set to be 1 and 1, the decimal numerical value converted from the numerical value of such two binary bits is 3, indicating that the data required by the access instruction is acquired in the memory.

For example, the reason that a location of the data required by the access instruction is derived according to the location where the delay is produced lies in that it takes several cycles from when the cache data reading is started to when the required data is read. For instance, in case of normal access, upon access to the Level 2 Cache, the reading of the Level 2 Cache is started only after the reading of the Level 1 Cache is finished (it takes 6 cycles from the failure in acquiring the required data in the Level 1 Cache to the access to the Level 2 Cache), and it also takes cycles to read the Level 2 Cache (for example, 8 periods). Since the Level 3 Cache is no longer accessed after the data required by the access instruction is acquired in the Level 2 Cache, there is no cycle for reading the Level 3 Cache, and therefore the location where the delay is finally produced upon cache access is the location of the data required by the access instruction.

In the above 4 groups of specific values of Bit 3 and Bit 2, each group of values is assigned according to an actual location where the data required by the access instruction is acquired, and the specific meaning corresponding to each group of values is set in advance and is used to determine the location of the data required by the access instruction.

Step S105-2: Upon access to a Level 1 Cache, a cache level or memory corresponding to the numerical value of the location identifier is accessed according to the numerical value of the location identifier, which is carried by the access instruction and marked with bits.

In this step, the numerical value of the location identifier read in Step S105-1, which is carried by the access instruction and marked with bits, is received, and upon access to the Level 1 Cache, a cache level or memory corresponding to the numerical value of the location identifier is accessed according to the numerical value of the location identifier, which is carried by the access instruction and marked with bits.

For example, if the read numerical value of the location identifier, which is carried by the access instruction and marked with bits, is 2, when data in the Level 1 Cache is being read, data in the Level 3 Cache is accessed concurrently.

It should be noted that, the accessing a cache level or memory corresponding to the numerical value of the location identifier may include: accessing the cache level or memory corresponding to the numerical value of the location identifier at the same moment when the access instruction starts to access the Level 1 Cache; or accessing the cache level or memory corresponding to the numerical value of the location identifier during the course that the access instruction is accessing the Level 1 Cache, as long as accessing the cache level or memory corresponding to the numerical value of the location identifier before the access instruction accesses the Level 1 Cache, both of which belong to the protection scope of the present disclosure.

After the step of accessing, upon access to a Level 1 Cache, a cache level or memory corresponding to the numerical value of the location identifier according to the numerical value of the location identifier, which is carried by the access instruction and marked with bits, in order to prevent a miss when the access instruction accesses the Level 1 Cache and performs the pre-fetch operation, the technical solution of the example embodiment provides an example implementation. The example implementation includes Steps S106-1 to S106-2, which are further described below with reference to FIG. 3.

Figure 3:
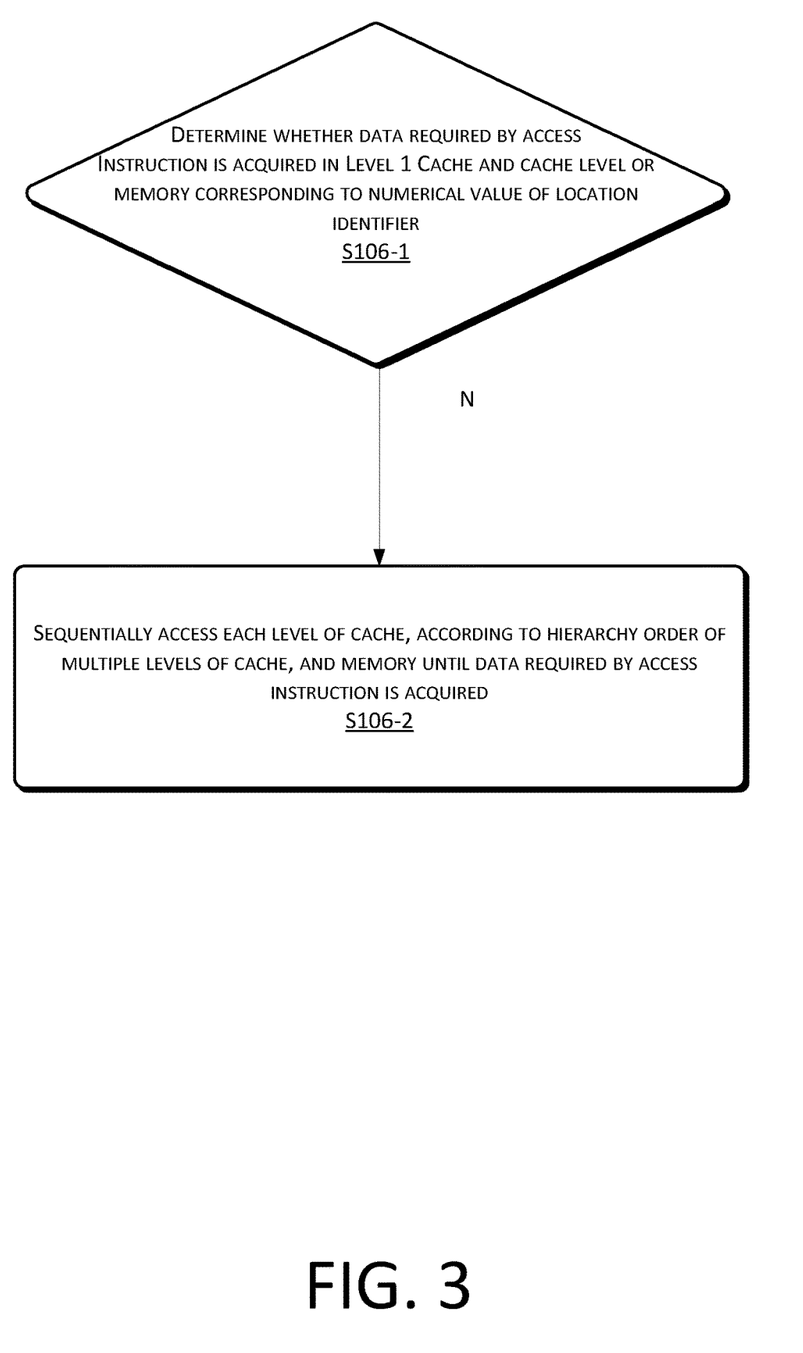
FIG. 3 is a flow chart of a miss prevention method according to an example embodiment of the present disclosure.

Refer to FIG. 3, which shows a flow chart of a miss prevention method according to an example embodiment of the present disclosure.

Step S106-1: Determined whether the data required by the access instruction is acquired in the Level 1 Cache and the cache level or memory corresponding to the numerical value of the location identifier.

In Step S101, when the access instruction for acquiring data is being read, volume information of the data that the access instruction needs to acquire is acquired, and it is determined whether the data required by the access instruction is acquired in the Level 1 Cache and the cache level or memory corresponding to the numerical value of the location identifier.

For example, data in the Level 1 Cache and data in the cache level or memory corresponding to the numerical value of the location identifier are read, and it is determined whether data with the same volume information and of the same data type as the data required by the access instruction is acquired upon reading.

Step S106-2: If a result of determination at S106-1 is no, each level of cache, according to a hierarchy order of multiple levels of cache, and memory are sequentially accessed, until the data required by the access instruction is acquired.

In this example embodiment, the sequentially accessing each level of cache according to a hierarchy order of multiple levels of cache and a memory until the data required by the access instruction is acquired may be implemented in the following manner: if data having the same amount information and of the same data type as the data required by the access instruction is not acquired upon reading, sequentially accessing the Level 2 Cache, Level 3 Cache, and memory, until the data required by the access instruction is acquired.

For example, the read numerical value of the location identifier, which is carried by the access instruction and marked with bits, is 2. After data in the Level 3 cache is concurrently accessed when data in the Level 1 Cache is read, if the data required by the access instruction is not acquired, the Level 2 Cache will be accessed, and if the data required by the access instruction is acquired in the Level 2 Cache, the cache access is stopped and the memory will not be accessed.

After the data required by the access instruction is acquired, in order to obtain a location of the data required by the access instruction, the technical solution of the example embodiment provides an example implementation. In the example implementation, after the data required by the access instruction is acquired, the location of the data acquired by the access instruction is recorded.

For example, if the data required by the access instruction is acquired in the Level 2 Cache, the location of the data acquired by the access instruction is recorded as the Level 2 Cache.

Step S107: The delay identifier and the location identifier carried by the access instruction are modified according to a location of the data acquired by the access instruction.

In this example embodiment, after the execution of Step 105, if a delay is produced, the following operations are performed: accessing a cache and performing, according to a location identifier carried by the access instruction, a pre-fetch operation, in order to make the delay identifier and the location identifier carried by the access instruction more accurate and prevent an error caused by a data location change. The operation of modifying, according to a location of the data acquired by the access instruction, the delay identifier and the location identifier carried by the access instruction may, for example, include Steps S107-1 to S107-4, which are described as follows:

Step S107-1: Determine whether the recorded location of the data acquired by the access instruction is the Level 1 Cache.

In this example embodiment, the determining whether the recorded location of the data acquired by the access instruction is the Level 1 Cache may be implemented in the following manner: acquiring the recorded location of the data acquired by the access instruction, and determining whether the recorded location of the data acquired by the access instruction is the Level 1 Cache.

Step S107-2: If a result of determining at S107-1 is yes, the delay identifier, which is carried by the access instruction and marked with bits, is decremented.

In this step, the determining result at the S107-1 is received, and if the recorded location of the data acquired by the access instruction is the Level 1 Cache, the delay identifier, which is carried by the access instruction and marked with bits, is decremented.

For example, the decrementing the delay identifier, which is carried by the access instruction and marked with bits, includes: acquiring values of Bit 1 and Bit 0 set in the cache line of the access instruction, and subtracting 1 from the value of Bit 0, where if the value of Bit 0 is 0, a borrow from Bit 1 is performed because of the binary bits.

For example, if the values of Bit 1 and Bit 0 are 1 and 1, after 1 is subtracted from the value of Bit 0, the values of Bit 1 and Bit 0 are 1 and 0; if the values of Bit 1 and Bit 0 are 1 and 0, a borrow from Bit 1 is performed when 1 is subtracted from the value of Bit 0, and the values of Bit 1 and Bit 0 will be 0 and 1.

It should be noted that, if the values of Bit 1 and Bit 0 are 0 and 0, after the delay identifier, which is carried by the access instruction and marked with bits, is decremented, the values of Bit 1 and Bit 0 are still 0 and 0.

When the pre-fetch operation is performed, in order to prevent repeating data acquisition upon reading the Level 1 Cache and the cache level or memory corresponding to the numerical value of the location identifier, the technical solution of this example embodiment provides an example implementation. The example implementation may include Steps S107-2-1 to S107-2-2, which are further described below with reference to FIG. 4.

Figure 4:
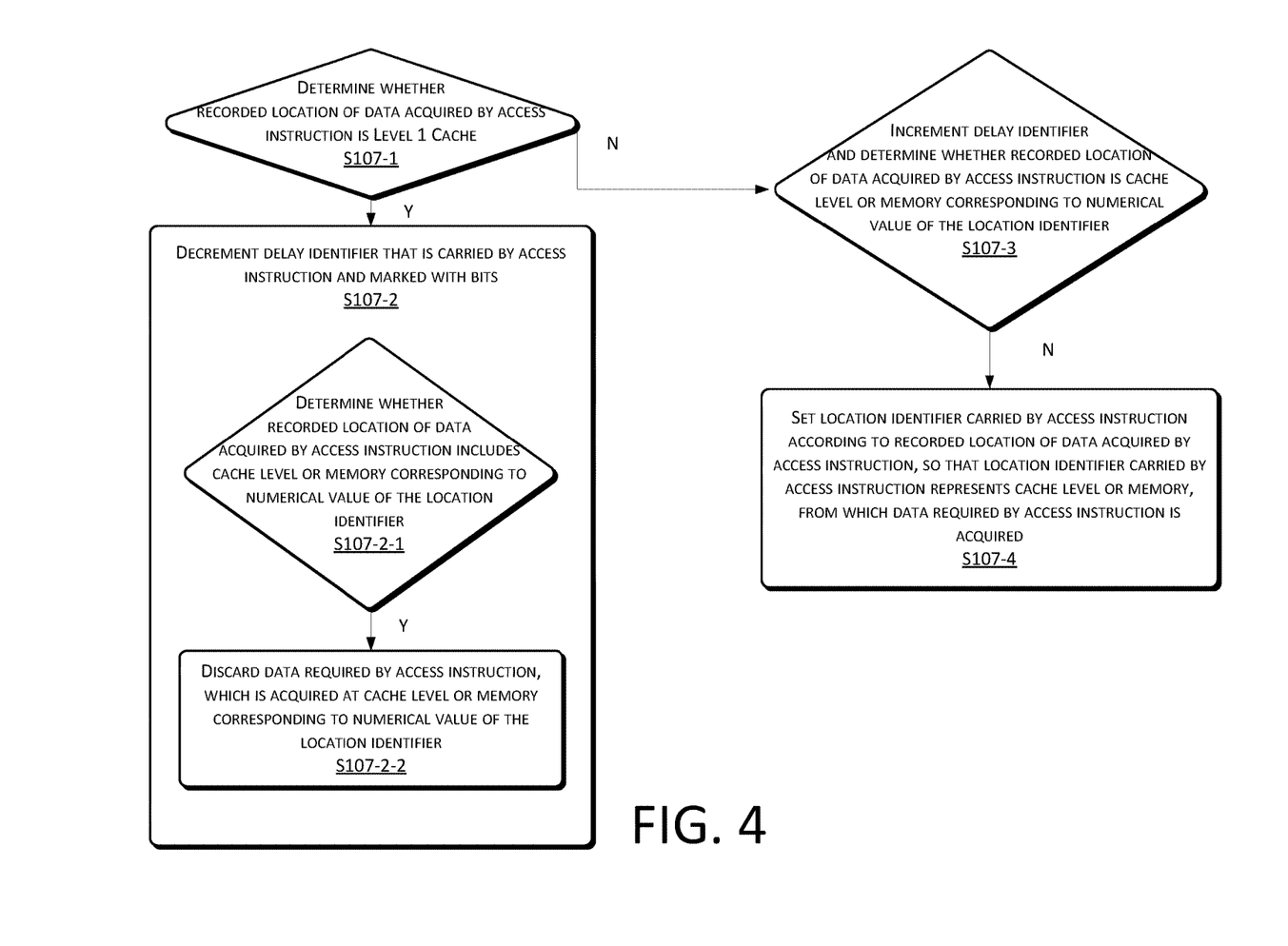
FIG. 4 is a flow chart of a data discarding method according to an example embodiment of the present disclosure.

Refer to FIG. 4, which shows a flow chart of a data discarding method according to an example embodiment of the present disclosure.

Step S107-2-1: Determine whether the recorded location of the data acquired by the access instruction includes the cache level or memory corresponding to the numerical value of the location identifier.

According to the recorded location of the data acquired by the access instruction, it is determined whether the recorded location of the data acquired by the access instruction further includes the cache level or memory corresponding to the numerical value of the location identifier, that is, 2 locations of the data acquired by the access instruction are recorded.

For example, if both the Level 1 Cache and the Level 3 Cache include the data required by the access instruction, and the pre-fetch operation is executed in the Level 3 Cache upon access, when the location of the data acquired by the access instruction is recoded, the Level 1 cache and the Level 3 Cache will be recorded.

Step S107-2-2: If a result of determining at S107-2-1 is yes, the data required by the access instruction, which is acquired at the cache level or memory corresponding to the numerical value of the location identifier, is discarded.

In this step, the determining result in Step S107-2-1 is received, and if the recorded location of the data acquired by the access instruction further includes the cache level or memory corresponding to the numerical value of the location identifier, the data required by the access instruction, which is acquired at the cache level or memory corresponding to the numerical value of the location identifier, is discarded.

For example, if the data required by the access instruction is included in both the Level 1 Cache and the Level 3 Cache, the data acquired from the Level 3 Cache by the pre-fetch operation is discarded.

Step S107-3: If a result of determining at S107-1 is no, the delay identifier, which is carried by the access instruction and marked with bits, is incremented, and it is determined whether the recorded location of the data acquired by the access instruction is the cache level or memory corresponding to the numerical value of the location identifier.

In this step, the determining result in Step S107-1 is received, and if the recorded location of the data acquired by the access instruction is not the Level 1 Cache, the delay identifier, which is carried by the access instruction and marked with bits, is incremented, and it is determined whether the recorded location of the data acquired by the access instruction is the cache level or memory corresponding to the numerical value of the location identifier.

For example, the incrementing the delay identifier, which is carried by the access instruction and marked with bits, includes: acquiring the values of Bit 1 and Bit 0 that are set in the cache line of the access instruction, and adding 1 to the value of Bit 0; if the value of Bit 0 is 1, a carry to Bit 1 is performed due to the binary bits.

For example, if the values of Bit 1 and Bit 0 are 0 and 1, a carry to Bit 1 is performed when 1 is added to the value of Bit 0, and the values of Bit 1 and Bit 0 will be 1 and 0; if the values of Bit 1 and Bit 0 are 1 and 0, 1 is added to the value of Bit 0, and the values of Bit 1 and Bit 0 will be 1 and 1.

It should be noted that, when the values of Bit 1 and Bit 0 are 1 and 1, after the delay identifier, which is carried by the access instruction and marked with bits, is incremented, the values of Bit 1 and Bit 0 are still 1 and 1 due to bit saturation.

In this example embodiment, the determining whether the recorded location of the data acquired by the access instruction is the cache level or memory corresponding to the numerical value of the location identifier may be implemented in the following manner: acquiring the recorded location of the data acquired by the access instruction and the cache level or memory corresponding to the numerical value of the location identifier, and determining whether the recorded location of the data acquired by the access instruction is consistent with the cache level or memory corresponding to the numerical value of the location identifier.

For example, the recorded location of the data acquired by the access instruction is the Level 2 Cache, and the location corresponding to the numerical value of the location identifier is the Level 3 Cache.

Step S107-4: If a result of determining at S107-3 is no, the location identifier carried by the access instruction is set according to the recorded location of the data acquired by the access instruction, so that the location identifier carried by the access instruction represents a cache level or memory, from which the data required by the access instruction is acquired.

In this step, the determining result in Step S107-3 is received, and if the recorded location of the data acquired by the access instruction is inconsistent with the cache level or memory corresponding to the numerical value of the location identifier, the location identifier carried by the access instruction is set according to the recorded location of the data acquired by the access instruction, so that the location identifier carried by the access instruction represents a cache level or memory, from which the data required by the access instruction is acquired.

In this example embodiment, the setting, according to the recorded location of the data acquired by the access instruction, the location identifier carried by the access instruction so that the location identifier carried by the access instruction represents a cache level or memory, from which the data required by the access instruction is acquired, may be implemented in the following manner: acquiring the recorded location of the data acquired by the access instruction, converting the location of the data acquired by the access instruction into corresponding specific values of Bit 3 and Bit 2 according to a preset corresponding relationship of Bit 3 and Bit 2, and setting, according to the specific values of Bit 3 and Bit 2, the location identifier carried by the access instruction.

For example, the recorded location of the data acquired by the access instruction is the Level 2 Cache. The values of Bit 3 and Bit 2 corresponding to the location identifier carried by the access instruction are 1 and 0, representing that the Level 3 Cache is accessed upon the pre-fetch operation. Then, the recorded location of the data acquired by the access instruction, which is the Level 2 Cache, will be converted into specific values 0 and 1 of corresponding Bit 3 and Bit 2. So, the values of Bit 3 and Bit 2 corresponding to the location identifier carried by the access instruction will be set, and the values of Bit 3 and Bit 2 corresponding to the location identifier carried by the access instruction are updated to be 0 and 1.

Since the conventional cache and memory access is to sequentially access each level according to the multi-level cache architecture of the cache, there will be a delay produced upon the cache and memory access. For example, the data required by the access instruction is in the memory, and each level is sequentially accessed according to the multi-level cache architecture. Before the memory is accessed, the Level 1 Cache, Level 2 Cache, and Level 3 Cache need to be accessed, thus producing an access delay. However, the technical solution according to the example embodiment of the present disclosure determines, by obstruction prediction, whether a delay would be produced upon the execution of the access instruction, and determines in which level of cache or memory the data required by the access instruction is located, and accesses the predicted location of the data required by the access instruction when each level is sequentially accessed according to the multi-level cache architecture, which saves the time for cache or memory access, improves the hit rate of data, and lowers the miss rate upon cache or memory access, thereby correspondingly lowering the power consumption generated upon cache access and improving the CPU performance.

Figure 5:
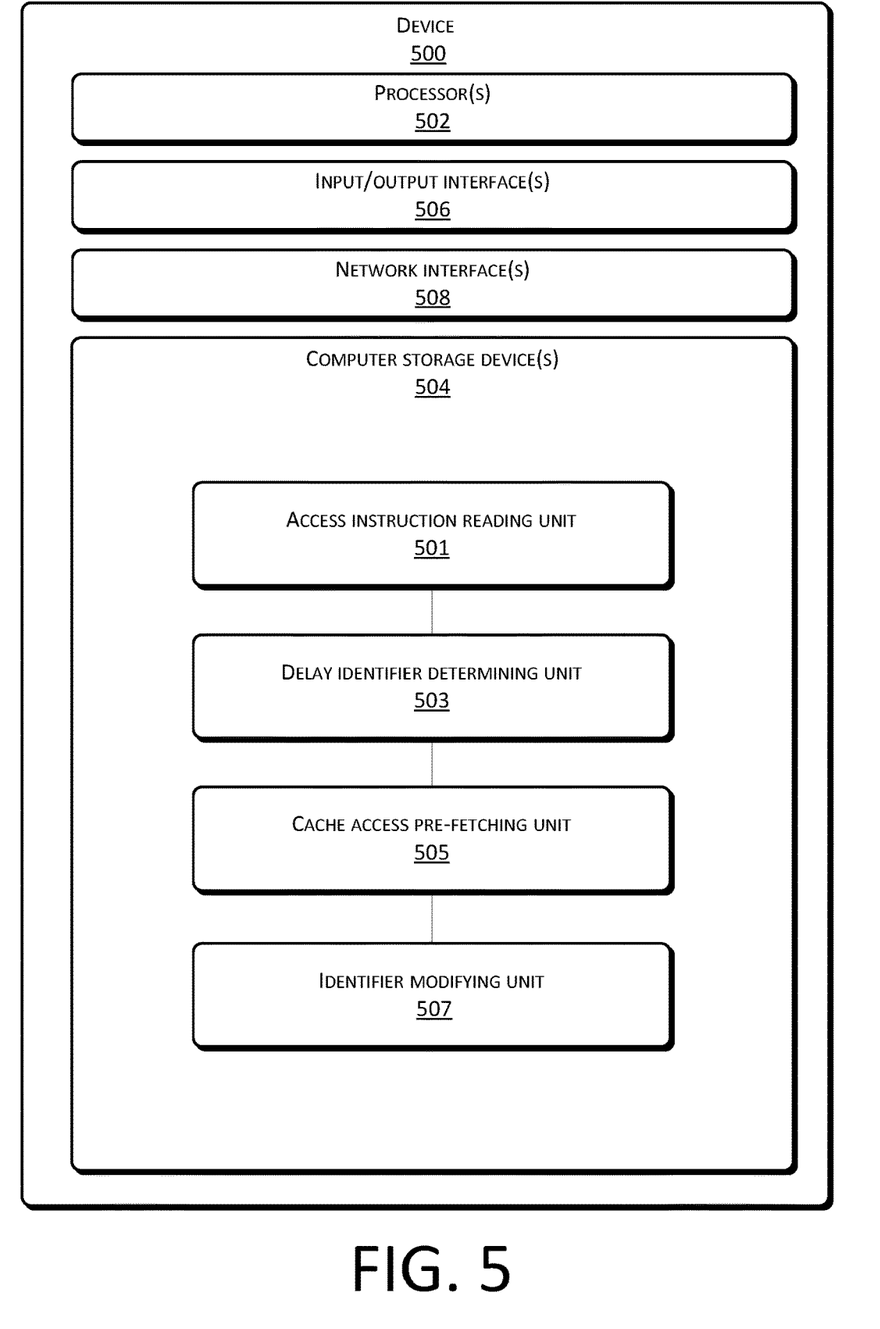
FIG. 5 is a schematic diagram of a device for accessing a cache according to an example embodiment of the present disclosure.

In the foregoing example embodiment, a method for accessing a cache is provided. Corresponding to the method for accessing a cache, the present disclosure further provides a device for accessing a cache. The device example embodiment is described in a relatively simple manner because the operations are substantially similar to those of the method example embodiment. For related parts, reference may be made to the description in the method example embodiment. The following description of the device example embodiment is merely illustrative. The example embodiment of the device for accessing a cache is described as follows:

Refer to FIG. 5, which shows a schematic diagram of a device 500 for accessing a cache according to an example embodiment of the present disclosure.

The device 500 includes one or more processor(s) 502 or data processing unit(s) and one or more computer storage device(s) 504. The device 500 may further include one or more input/output interface(s) 506, and network interface(s) 508. The computer storage device 504 is an example of computer readable media.

The computer storage device 504 may store therein a plurality of modules or units including an access instruction reading unit 501, a delay identifier determining unit 503, a cache access pre-fetching unit 505, and an identifier modifying unit 507.

The access instruction reading unit 501 reads an access instruction for acquiring data.

The delay identifier determining unit 503 determines, according to a delay identifier carried by the access instruction, whether the access instruction produces a delay.

The cache access pre-fetching unit 505 receives the determining result from the delay identifier determining unit 503, and if a delay is produced, accesses a cache and performs, according to a location identifier carried by the access instruction, a pre-fetch operation.

The identifier modifying unit 507 modifies, according to a location of the data acquired by the access instruction, the delay identifier and the location identifier carried by the access instruction.

Optionally, the delay identifier determining unit 503 further determines, according to identifiers, marked with bits, set in a cache line of the access instruction, whether the access instruction produces a delay.

Optionally, the delay identifier determining unit 503 further determines, according to the delay identifier carried by the access instruction, whether the access instruction produces a delay, which is produced upon a level-by-level cache access in case of data missing, or a delay, which is produced when the access instruction executes a computation.

Optionally, the delay identifier determining unit 503 further reads a numerical value of the delay identifier, which is carried by the access instruction and marked with bits, to determine whether the access instruction produces a delay.

Optionally, the delay identifier determining unit 503 includes a numerical value reading sub-unit and a cache access pre-fetch trigger sub-unit.

The numerical value reading sub-unit reads a numerical value of the delay identifier, which is carried by the access instruction and marked with binary bits, and determines whether the numerical value of the delay identifier, which is carried by the access instruction and marked with binary bits, is greater than 1.

The cache access pre-fetch trigger sub-unit receives the determining result from the numerical value reading sub-unit, and triggers the cache access pre-fetching unit if the numerical value is greater than 1.

Optionally, the cache access pre-fetching unit 505 includes: a bit numerical value reading sub-unit and a cache access pre-fetch sub-unit.

The bit numerical value reading sub-unit reads a numerical value of the location identifier, which is carried by the access instruction and marked with bits.

The cache access pre-fetch sub-unit accesses, upon access to a Level 1 Cache, a cache level or memory corresponding to the numerical value of the location identifier according to the numerical value of the location identifier that is carried by the access instruction and marked with bits.

Optionally, the cache access pre-fetching unit 505 further include: a data acquisition determining sub-unit and a level-by-level access sub-unit.

Upon access to the Level 1 Cache, after accessing the cache level or memory corresponding to the numerical value of the location identifier according to the numerical value of the location identifier that is carried by the access instruction and marked with bits, the data acquisition determining sub-unit determines whether the data required by the access instruction is acquired in the Level 1 Cache and the cache level or memory corresponding to the numerical value of the location identifier.

The level-by-level access sub-unit receives the determining result from the data acquisition determining sub-unit, and if a result is no, sequentially accesses each level of cache and a memory according to a hierarchy order of multiple levels of cache, until the data required by the access instruction is acquired.

Optionally, the device 500 may further include a location recording unit (not shown in FIG. 5). The location recording unit records the location of the data acquired by the access instruction.

Optionally, the identifier modifying unit 507 includes: a location determining sub-unit, a decrementing sub-unit, an incrementing sub-unit, and a location identifier setting sub-unit (all not shown).

The location determining sub-unit determines whether the recorded location of the data acquired by the access instruction is the Level 1 Cache;

The decrementing sub-unit receives the determining result from the location determining sub-unit, and if the determining result is yes, decrements the delay identifier which is carried by the access instruction and marked with bits.

The incrementing sub-unit receives the determining result from the position determining sub-unit; if the determining result is no, increments the delay identifier, which is carried by the access instruction and marked with bits, and determines whether the recorded location of the data acquired by the access instruction is the cache level or memory corresponding to the numerical value of the location identifier.

The location identifier setting sub-unit receives the determining result from the incrementing sub-unit; and if the determining result is no, sets, according to the recorded location of the data acquired by the access instruction, the location identifier carried by the access instruction, so that the location identifier carried by the access instruction represents a cache level or memory, from which the data required by the access instruction is acquired.

Optionally, the decrementing sub-unit includes a repeated location determining sub-unit and a data discarding sub-unit (both not shown).

The repeated location determining sub-unit, after the delay identifier, which is carried by the access instruction and marked with bits is decremented, determines whether the recorded location of the data acquired by the access instruction includes the cache level or memory corresponding to the numerical value of the location identifier.

The data discarding sub-unit receives the determining result of the repeated location determining sub-unit; and if the determining result is yes, discards the data required by the access instruction, which is acquired at the cache level or memory corresponding to the numerical value of the location identifier.

Figure 6:
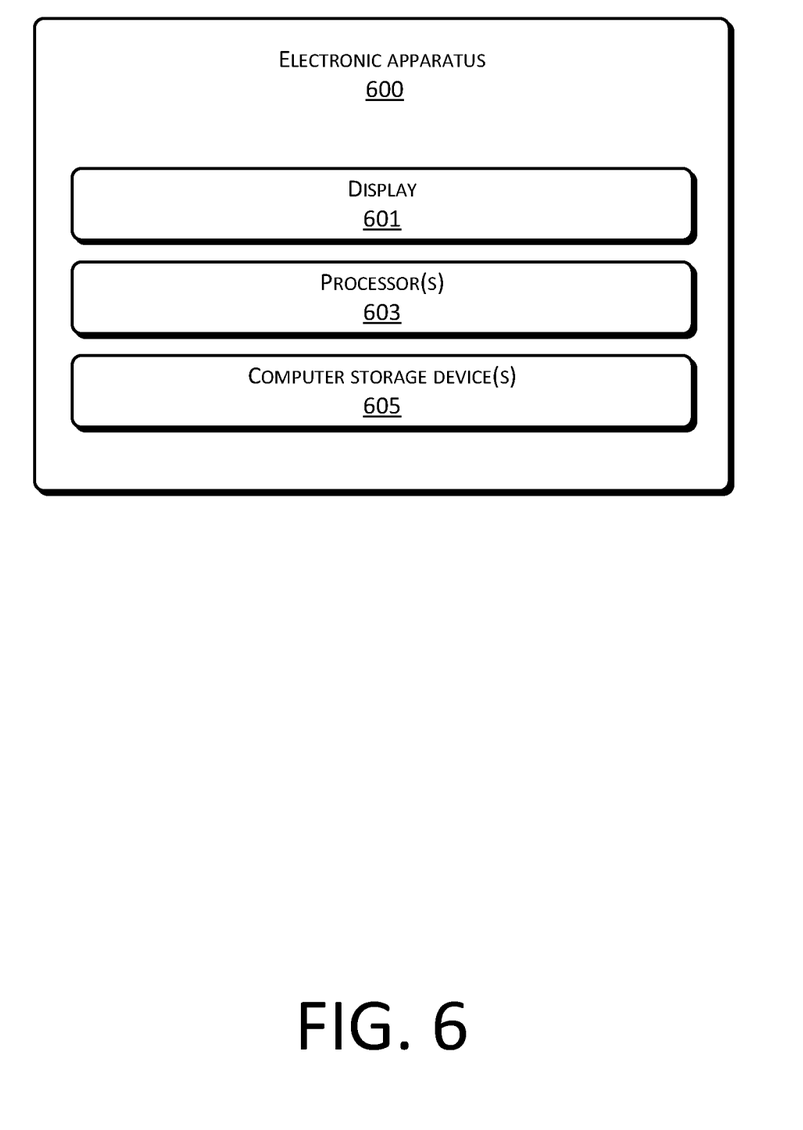
FIG. 6 is a schematic diagram of an electronic apparatus according to an example embodiment of the present disclosure.

In the foregoing example embodiments, a method for accessing a cache and a device for accessing a cache are provided. In addition, the present disclosure further provides an electronic apparatus and an example embodiment of the electronic apparatus is described as follows:

Refer to FIG. 6, which is a schematic diagram of an electronic apparatus 600 according to an example embodiment of the present disclosure.

The electronic apparatus includes a display 601, one or more processor(s) 603 or data processing unit(s), and one or more computer storage device(s) 605. The computer storage device 605 is an example of computer readable media.

The computer storage device 605 stores cache parallel accessing program or computer-executable instructions, which, when being read and executed by the processors 603, executes the following operations: reading an access instruction for acquiring data; determining, according to a delay identifier carried by the access instruction, whether the access instruction produces a delay; accessing a cache and performing, according to a location identifier carried by the access instruction, a pre-fetch operation if a delay is produced; and modifying, according to a location of the data acquired by the access instruction, the delay identifier and the location identifier carried by the access instruction.

In a typical configuration, a device includes one or more Central Processing Units (CPUs), I/O interfaces, network interfaces, and computer readable media.

The computer readable media may include a volatile memory, a Random Access Memory (RAM), and/or non-volatile memory, e.g., Read-Only Memory (ROM) or flash RAM, and so on.

1. Computer readable media include permanent, nonpermanent, mobile and immobile media, which can implement information storage through any method or technologies. The information may be computer-executable instructions, data structures, program modules or other data. Examples of storage media of computers include, but not limited to, Phase-change RAMs (PRAMs), Static RAMs (SRAMs), Dynamic RAMs (DRAMs), other types of Random Access Memories (RAMs), Read-Only Memories (ROMs), Electrically Erasable Programmable Read-Only Memories (EE-PROMs), flash memories or other internal memory technologies, Compact Disk Read-Only Memories (CD-ROMs), Digital Versatile Discs (DVDs) or other optical memories, cassettes, cassette and disk memories or other magnetic memory devices or any other non-transmission media, which can be used for storing information which can be accessed by the computation device. According to the definitions herein, the computer readable media exclude non-transitory computer readable medium (transitory media), such as modulated data signals and carriers.

2. Persons skilled in the art should understand that, the example embodiments of the present disclosure may be implemented as a method, a system, or a computer program product. Therefore, the present disclosure may be implemented as a completely hardware embodiment, a completely software embodiment, or an embodiment combing software and hardware. Moreover, the present disclosure may be a computer program product implemented on one or more computer usable storage media (including, but not limited to, a magnetic disk memory, a CD-ROM, an optical memory, and the like) storing computer-executable instructions.

Although the example embodiments of the present disclosure are disclosed above, they should not be used to limit the present disclosure. Those skilled in the art may make possible changes and modifications without departing from the spirit and scope of the present disclosure. Therefore, the protection scope of the present disclosure shall be subject to the scope defined by the claims of the present disclosure.

What is claimed is:

1. A method for accessing a cache, the method comprising:
   reading an access instruction for acquiring data;
   determining, according to a delay identifier carried by the access instruction, whether the access instruction produces a delay;
   accessing the cache and performing, according to a location identifier carried by the access instruction, a pre-fetch operation in response to determining that the access instruction produces the delay; and
   modifying, according to a location of the data acquired by the access instruction, the delay identifier and the location identifier carried by the access instruction.

2. The method for accessing the cache of claim 1, wherein the delay includes a delay produced upon a level-by-level cache access in case of data missing.

3. The method for accessing the cache of claim 1, wherein the delay includes a delay produced when the access instruction executes a computation.

4. The method for accessing the cache of claim 1, wherein the delay identifier and the location identifier carried by the access instruction are identifiers, marked with bits, set in a cache line of the access instruction.

5. The method for accessing a cache of claim 1, wherein the determining, according to the delay identifier carried by the access instruction, whether the access instruction produces a delay includes:
   reading a numerical value of the delay identifier marked with bits to determine whether the access instruction produces a delay.

6. The method for accessing the cache of claim 5, wherein the reading the numerical value of the delay identifier marked with bits to determine whether the access instruction produces the delay includes:
   reading the numerical value of the delay identifier;
   determining whether the numerical value of the delay identifier is greater than 1; and
   indicating that the access instruction produces the delay, accessing the cache and performing, according to the location identifier, the pre-fetch operation, in response to determining that the numerical value is greater than 1.

7. The method for accessing the cache of claim 1, wherein the accessing the cache and performing, according to the location identifier carried by the access instruction, the pre-fetch operation in response to determining that the access instruction produces the delay includes:
   reading a numerical value of the location identifier marked with bits; and
   accessing, upon access to a Level 1 Cache, a cache level or memory corresponding to the numerical value of the location identifier according to the numerical value of the location identifier.

8. The method for accessing the cache of claim 7, further comprising:
   after accessing, upon access to the Level 1 Cache, the cache level or memory corresponding to the numerical value of the location identifier according to the numerical value of the location identifier,
      determining whether data required by the access instruction is acquired in the Level 1 Cache and the cache level or memory corresponding to the numerical value of the location identifier; and
      sequentially accessing each level of cache according to a hierarchy order of multiple levels of cache and memory, until the data required by the access instruction is acquired, in response to determining that the data is not acquired.

9. The method for accessing the cache of claim 8, further comprising:
   recording the location of the data acquired by the access instruction, after the data required by the access instruction is acquired.

10. The method for accessing the cache of claim 1, wherein the modifying, according to the location of the data acquired by the access instruction, the delay identifier and the location identifier carried by the access instruction includes:
    determining whether the location of the data acquired by the access instruction is a Level 1 Cache; and
    decrementing the delay identifier in response to determining that the location of the data acquired by the access instruction is the Level 1 Cache.

11. The method for accessing the cache of claim 10, further comprising:
    after decrementing the delay identifier,
       determining whether the location of the data acquired by the access instruction includes the cache level or memory corresponding to the numerical value of the location identifier; and
       discarding data required by the access instruction, which is acquired from the cache level or memory corresponding to the numerical value of the location identifier, in response to determining that the location of the data acquired by the access instruction includes the cache level or memory corresponding to the numerical value of the location identifier.

12. The method for accessing the cache of claim 1, wherein the modifying, according to the location of the data acquired by the access instruction, the delay identifier and the location identifier carried by the access instruction includes:
    determining whether the location of the data acquired by the access instruction is a Level 1 Cache; and in response to determining that the location of the data acquired by the access instruction is not the Level 1 Cache,
incrementing the delay identifier;
determining whether the location of the data acquired by the access instruction is the cache level or memory corresponding to the numerical value of the location identifier; and
setting, according to the location of the data acquired by the access instruction, the location identifier, so that the location identifier represents a cache level or memory, from which data required by the access instruction is acquired, in response to determining that the location of the data acquired by the access instruction is not the cache level or memory corresponding to the numerical value of the location identifier.

13. A device for accessing a cache, the device comprising:
an access instruction reading unit that reads an access instruction for acquiring data;
a delay identifier determining unit that determines, according to a delay identifier carried by the access instruction, whether the access instruction produces a delay;
a cache access pre-fetching unit that accesses the cache and performs, according to a location identifier carried by the access instruction, a pre-fetch operation in response to determining that the access instruction produces the delay; and
an identifier modifying unit that modifies, according to a location of the data acquired by the access instruction, the delay identifier and the location identifier carried by the access instruction.

14. The device for accessing the cache of claim 13, wherein the delay identifier determining unit further determines, according to the delay identifier that is marked with bits and set in a cache line of the access instruction, whether the access instruction produces a delay.

15. The device for accessing a cache of claim 13, wherein the delay identifier determining unit further determines, according to the delay identifier, whether the access instruction produces the delay, which is produced either upon a level-by-level cache access in case of data missing, or when the access instruction executes a computation.

16. The device for accessing a cache of claim 13, wherein the delay identifier determining unit further reads a numerical value of the delay identifier marked with bits to determine whether the access instruction produces the delay.

17. The device for accessing a cache of claim 16, wherein the delay identifier determining unit includes:
a numerical value reading sub-unit that reads the numerical value of the delay identifier marked with binary bits and determine whether the numerical value of the delay identifier is greater than 1; and
a cache access pre-fetch trigger sub-unit that receives a determining result from the numerical value reading sub-unit, and triggers the cache access pre-fetching unit in response to determining that in the determination result that the numerical value is greater than 1.

18. The device for accessing a cache of claim 13, wherein the cache access pre-fetching unit includes:
a bit numerical value reading sub-unit that reads a numerical value of the location identifier that is marked with bits; and
a cache access pre-fetch sub-unit that accesses, upon access to a Level 1 Cache, a cache level or memory corresponding to the numerical value of the location identifier according to the numerical value of the location identifier.

19. The device for accessing a cache of claim 13, wherein the cache access pre-fetching unit includes:
a data acquisition determining sub-unit that, after accessing, upon an access to a Level 1 Cache, according to a numerical value of the location identifier marked with bits, a cache level or memory corresponding to a numerical value of the location identifier, determines whether the data required by the access instruction is acquired in the Level 1 Cache and the cache level or memory corresponding to the numerical value of the location identifier; and
a level-by-level access sub-unit that receives a result from the data acquisition determining sub-unit, and in response to determining that the result is that the data is not acquired, sequentially accesses each level of cache, according to a hierarchy order of multiple levels of cache, and the memory, until the data required by the access instruction is acquired.

20. An electronic apparatus comprising:
a display;
one or more processors; and
one or more computer storage devices that store computer-executable instructions, that, when executed by the one or more one processors, direct the electronic apparatus to perform acts comprising:
reading an access instruction for acquiring data;
determining, according to a delay identifier carried by the access instruction, whether the access instruction produces a delay;
accessing the cache and performing, according to a location identifier carried by the access instruction, a pre-fetch operation in response to determining that the access instruction produces the delay; and
modifying, according to a location of the data acquired by the access instruction, the delay identifier and the location identifier carried by the access instruction.

* * * * *